United States Patent
Trandal et al.

(10) Patent No.: US 8,081,337 B2
(45) Date of Patent: *Dec. 20, 2011

(54) FACSIMILE TELECOMMUNICATIONS SYSTEM AND METHOD

(75) Inventors: David S. Trandal, Santa Barbara, CA (US); David J. Brahm, Santa Barbara, CA (US); Leland W. Kirchhoff, Santa Barbara, CA (US); Robert A. Dolan, Santa Barbara, CA (US); David F. Hofstatter, Santa Barbara, CA (US)

(73) Assignee: j2 Global Communications, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/985,958

(22) Filed: Jan. 6, 2011

(65) Prior Publication Data

US 2011/0096369 A1    Apr. 28, 2011

Related U.S. Application Data

(63) Continuation of application No. 12/355,470, filed on Jan. 16, 2009, now Pat. No. 7,869,076, which is a continuation of application No. 10/795,025, filed on Mar. 5, 2004, now Pat. No. 7,480,065.

(51) Int. Cl.
*H04N 1/00* (2006.01)
(52) U.S. Cl. ....... 358/1.15; 358/402; 358/440; 358/407; 379/100.08; 379/100.09; 379/142.07; 379/142.08
(58) Field of Classification Search .................. 358/402, 358/407, 440, 442, 1.15; 379/100.08, 100.09, 379/100.12, 142.07, 142.08, 210.02, 211.01, 379/211.02, 215.01

See application file for complete search history.

(56) References Cited

U.S. PATENT DOCUMENTS

| | | | |
|---|---|---|---|
| 3,936,613 | A | 2/1976 | Nishigori et al. |
| 3,956,595 | A | 5/1976 | Sobanski |
| 4,009,337 | A | 2/1977 | Sakai et al. |
| 4,022,983 | A | 5/1977 | Braun et al. |
| 4,485,470 | A | 11/1984 | Reali |
| 4,736,405 | A | 4/1988 | Akiyama |
| 4,809,321 | A | 2/1989 | Morganstein et al. |
| 4,893,336 | A | 1/1990 | Wuthnow |
| 4,994,926 | A | 2/1991 | Gordon et al. |
| 5,040,208 | A | 8/1991 | Jolissaint |

(Continued)

FOREIGN PATENT DOCUMENTS

CA    1329852    9/1989

(Continued)

OTHER PUBLICATIONS

Non-Final Office Action (dated Jun. 22, 2009), U.S. Appl. No. 12/348,492, Date Filed—Jan. 5, 2009, First Named Inventor: Leland Kirchhoff, (21 pages).

(Continued)

*Primary Examiner* — Kimberly A Williams
(74) *Attorney, Agent, or Firm* — Blakely, Sokoloff, Taylor & Zafman LLP (57) ABSTRACT

A fax processing system handles faxes that are originally destined for a recipient's phone number. The fax processing system communicates with the fax recipient via a data communications network (for example, the Internet) and can provide more sophisticated fax handling capabilities than conventional fax machines.

24 Claims, 7 Drawing Sheets

U.S. PATENT DOCUMENTS

| | | | |
|---|---|---|---|
| 5,046,087 A | 9/1991 | Sakai | |
| 5,291,302 A | 3/1994 | Gordon et al. | |
| 5,404,537 A | 4/1995 | Olnowich et al. | |
| 5,434,908 A | 7/1995 | Klein | |
| 5,459,584 A | 10/1995 | Gordon et al. | |
| 5,467,388 A | 11/1995 | Redd, Jr. et al. | |
| 5,526,524 A | 6/1996 | Madduri | |
| 5,533,102 A | 7/1996 | Robinson et al. | |
| 5,577,111 A | 11/1996 | Iida et al. | |
| 5,583,918 A | 12/1996 | Nakagawa | |
| 5,619,557 A | 4/1997 | Van Berkum et al. | |
| 5,640,677 A | 6/1997 | Karlsson | |
| 5,644,404 A * | 7/1997 | Hashimoto et al. | 358/402 |
| 5,651,054 A | 7/1997 | Dunn et al. | |
| 5,668,861 A | 9/1997 | Watts | |
| 5,751,795 A | 5/1998 | Hassler et al. | |
| 5,761,312 A | 6/1998 | Zelikovitz et al. | |
| 5,774,067 A | 6/1998 | Olnowich et al. | |
| 5,805,587 A | 9/1998 | Norris et al. | |
| 5,809,128 A | 9/1998 | McMullin | |
| 5,812,551 A | 9/1998 | Tsukazoe et al. | |
| 5,825,867 A | 10/1998 | Epler et al. | |
| 5,832,060 A | 11/1998 | Corlett et al. | |
| 5,835,573 A | 11/1998 | Dee et al. | |
| 5,894,504 A | 4/1999 | Alfred et al. | |
| 5,946,106 A | 8/1999 | Itoh et al. | |
| 5,946,386 A | 8/1999 | Rogers et al. | |
| 5,960,064 A | 9/1999 | Foladare et al. | |
| 5,960,073 A | 9/1999 | Kikinis et al. | |
| 5,963,629 A | 10/1999 | Jung | |
| 5,995,594 A | 11/1999 | Shaffer et al. | |
| 5,995,603 A | 11/1999 | Anderson | |
| 6,014,436 A | 1/2000 | Florence et al. | |
| 6,032,051 A | 2/2000 | Hall et al. | |
| 6,034,956 A | 3/2000 | Olnowich et al. | |
| 6,035,031 A | 3/2000 | Silverman | |
| 6,043,902 A * | 3/2000 | Sato | 358/407 |
| 6,044,059 A | 3/2000 | Olnowich | |
| 6,078,581 A | 6/2000 | Shtivelman et al. | |
| 6,104,800 A | 8/2000 | Benson | |
| 6,144,644 A | 11/2000 | Bajzath et al. | |
| 6,160,881 A | 12/2000 | Beyda et al. | |
| 6,167,127 A | 12/2000 | Smith et al. | |
| 6,169,795 B1 | 1/2001 | Dunn et al. | |
| 6,169,796 B1 | 1/2001 | Bauer et al. | |
| 6,178,183 B1 | 1/2001 | Buskirk, Jr. | |
| 6,181,691 B1 | 1/2001 | Markgraf et al. | |
| 6,208,638 B1 | 3/2001 | Rieley et al. | |
| 6,212,261 B1 | 4/2001 | Meubus et al. | |
| 6,230,009 B1 | 5/2001 | Holmes et al. | |
| 6,243,378 B1 | 6/2001 | Olnowich | |
| 6,253,249 B1 | 6/2001 | Belzile | |
| 6,278,704 B1 | 8/2001 | Creamer et al. | |
| 6,304,565 B1 | 10/2001 | Ramamurthy | |
| 6,310,939 B1 | 10/2001 | Varney | |
| 6,333,973 B1 | 12/2001 | Smith et al. | |
| 6,350,066 B1 | 2/2002 | Bobo, II | |
| 6,353,660 B1 | 3/2002 | Burger et al. | |
| 6,353,663 B1 | 3/2002 | Stevens et al. | |
| 6,363,414 B1 | 3/2002 | Nicholls et al. | |
| 6,405,035 B1 | 6/2002 | Singh | |
| 6,411,601 B1 | 6/2002 | Shaffer et al. | |
| 6,411,805 B1 | 6/2002 | Becker et al. | |
| 6,438,216 B1 | 8/2002 | Aktas | |
| 6,438,222 B1 | 8/2002 | Burg | |
| 6,477,246 B1 | 11/2002 | Dolan et al. | |
| 6,483,600 B1 | 11/2002 | Schuster et al. | |
| 6,496,569 B2 | 12/2002 | Pelletier et al. | |
| 6,496,576 B2 | 12/2002 | Tanaka et al. | |
| 6,501,750 B1 | 12/2002 | Shaffer et al. | |
| 6,505,163 B1 | 1/2003 | Zhang et al. | |
| 6,510,162 B1 | 1/2003 | Fijolek et al. | |
| 6,510,417 B1 | 1/2003 | Woods et al. | |
| 6,512,930 B2 | 1/2003 | Sandegren | |
| 6,519,258 B1 | 2/2003 | Tsukazoe et al. | |
| 6,539,084 B1 | 3/2003 | Long | |
| 6,546,087 B2 | 4/2003 | Shaffer et al. | |
| 6,549,612 B2 | 4/2003 | Gifford et al. | |
| 6,553,222 B1 | 4/2003 | Weiss | |
| 6,564,264 B1 | 5/2003 | Creswell et al. | |
| 6,564,321 B2 | 5/2003 | Bobo, II | |
| 6,567,505 B1 | 5/2003 | Omori et al. | |
| 6,574,319 B2 | 6/2003 | Latter et al. | |
| 6,594,351 B1 | 7/2003 | Bhogal et al. | |
| 6,603,837 B1 | 8/2003 | Kesanupalli et al. | |
| 6,621,892 B1 | 9/2003 | Banister et al. | |
| 6,643,034 B1 | 11/2003 | Gordon et al. | |
| 6,662,232 B1 | 12/2003 | Nicholls et al. | |
| 6,690,785 B1 | 2/2004 | Stelter et al. | |
| 6,711,154 B1 | 3/2004 | O'Neal | |
| 6,751,299 B1 | 6/2004 | Brown et al. | |
| 6,775,370 B2 | 8/2004 | Burg | |
| 6,782,088 B1 | 8/2004 | Gabara | |
| 6,785,021 B1 | 8/2004 | Gordon et al. | |
| 6,785,379 B1 | 8/2004 | Rogers et al. | |
| 6,792,094 B1 | 9/2004 | Kirkpatrick | |
| 6,798,870 B1 | 9/2004 | Lines et al. | |
| 6,801,932 B1 | 10/2004 | Picoult et al. | |
| 6,853,714 B2 | 2/2005 | Liljestrand et al. | |
| 6,857,074 B2 | 2/2005 | Bobo, II | |
| 6,898,275 B2 | 5/2005 | Dolan et al. | |
| 6,928,479 B1 | 8/2005 | Meyer et al. | |
| 6,968,174 B1 | 11/2005 | Trandal et al. | |
| 7,003,087 B2 | 2/2006 | Spencer et al. | |
| 7,136,475 B1 | 11/2006 | Rogers et al. | |
| 7,180,638 B1 * | 2/2007 | Hou et al. | 358/402 |
| 7,230,745 B1 | 6/2007 | Street, Jr. | |
| 7,245,611 B2 | 7/2007 | Narasimhan et al. | |
| 7,283,270 B2 * | 10/2007 | Boire-Lavigne et al. | 358/1.15 |
| 7,474,432 B1 | 1/2009 | Kirchhoff et al. | |
| 7,480,065 B1 * | 1/2009 | Trandal et al. | 358/1.15 |
| 7,492,473 B2 | 2/2009 | Ferlitsch et al. | |
| 7,742,184 B2 | 6/2010 | Seki et al. | |
| 7,869,076 B1 * | 1/2011 | Trandal et al. | 358/1.15 |
| 2002/0010616 A1 | 1/2002 | Itzhaki | |
| 2002/0041391 A1 | 4/2002 | Bannai | |
| 2002/0093674 A1 | 7/2002 | Ferlitsch et al. | |
| 2002/0097710 A1 | 7/2002 | Burg | |
| 2002/0126321 A1 * | 9/2002 | Trachtman | 358/407 |
| 2002/0131561 A1 * | 9/2002 | Gifford et al. | 379/67.1 |
| 2003/0039339 A1 | 2/2003 | Luehrig et al. | |
| 2003/0048484 A1 | 3/2003 | Seki et al. | |
| 2003/0071117 A1 | 4/2003 | Meade, II | |
| 2003/0072432 A1 | 4/2003 | Kelly | |
| 2003/0095541 A1 | 5/2003 | Chang et al. | |
| 2003/0123622 A1 * | 7/2003 | Gifford et al. | 379/88.13 |
| 2003/0156700 A1 | 8/2003 | Brown et al. | |
| 2003/0215078 A1 | 11/2003 | Brahm et al. | |
| 2004/0001221 A1 | 1/2004 | McCallum | |
| 2004/0028203 A1 | 2/2004 | Wurster et al. | |
| 2004/0051912 A1 | 3/2004 | Schlank et al. | |
| 2004/0125924 A1 | 7/2004 | McMullin et al. | |
| 2004/0146153 A1 | 7/2004 | Solin | |
| 2004/0184096 A1 | 9/2004 | Choi | |
| 2004/0190706 A1 | 9/2004 | Fleischer, III et al. | |
| 2004/0205169 A1 | 10/2004 | Machida | |
| 2004/0252349 A1 | 12/2004 | Green et al. | |
| 2004/0258220 A1 | 12/2004 | Levine et al. | |
| 2005/0041643 A1 | 2/2005 | Noguchi et al. | |
| 2005/0053216 A1 | 3/2005 | Spencer et al. | |
| 2005/0123118 A1 | 6/2005 | Terry et al. | |
| 2005/0153739 A1 | 7/2005 | Halsell | |
| 2005/0154599 A1 | 7/2005 | Kopra et al. | |
| 2005/0190404 A1 * | 9/2005 | Nakamura | 358/1.15 |
| 2005/0207556 A1 | 9/2005 | Gonzalez et al. | |
| 2005/0275871 A1 | 12/2005 | Baird et al. | |
| 2005/0275878 A1 * | 12/2005 | Hiatt et al. | 358/1.15 |
| 2006/0013374 A1 | 1/2006 | Fleischer et al. | |
| 2006/0099971 A1 | 5/2006 | Staton et al. | |
| 2006/0209342 A1 | 9/2006 | Ferlitsch et al. | |
| 2006/0268007 A1 | 11/2006 | Gopalakrishnan | |
| 2006/0268831 A1 | 11/2006 | Ulybin | |

| | | | |
|---|---|---|---|
| 2006/0290974 A1* | 12/2006 | Kano et al. | 358/1.15 |
| 2007/0002077 A1 | 1/2007 | Gopalakrishnan | |
| 2007/0013960 A9 | 1/2007 | Gordon et al. | |
| 2007/0067738 A1 | 3/2007 | Flynt et al. | |
| 2007/0116213 A1 | 5/2007 | Gruchala et al. | |
| 2007/0202898 A1 | 8/2007 | Bae et al. | |
| 2007/0223053 A1 | 9/2007 | Jin | |
| 2007/0223056 A1 | 9/2007 | Arimoto | |
| 2007/0229910 A1 | 10/2007 | Ulybin | |
| 2008/0075250 A1 | 3/2008 | Kent et al. | |
| 2008/0184270 A1* | 7/2008 | Cole et al. | 719/318 |
| 2010/0159900 A1 | 6/2010 | Seki et al. | |
| 2010/0177879 A1 | 7/2010 | Liljestrand et al. | |
| 2010/0214609 A1 | 8/2010 | Ratnam et al. | |
| 2010/0296121 A1 | 11/2010 | Shaheen, III et al. | |

FOREIGN PATENT DOCUMENTS

| | | |
|---|---|---|
| EP | 1120954 A2 | 8/2001 |
| JP | 10513632 | 12/1998 |
| JP | 11506292 | 6/1999 |
| JP | 2001168989 | 6/2001 |
| WO | WO-0060840 | 10/2000 |
| WO | WO-0176210 A1 | 10/2001 |

OTHER PUBLICATIONS

Non-Final Office Action (dated Feb. 1, 2010), U.S. Appl. No. 12/348,492, Date Filed—Jan. 5, 2009, First Named Inventor: Leland Kirchhoff, (9 pages).

Non-Final Office Action (dated Mar. 19, 2010), U.S. Appl. No. 12/355,470, Date Filed Jan. 6, 2009, First Named Inventor: Leland Kirchhoff, (17 pages).

Non-Final Office Action (dated Dec. 23, 2010), U.S. Appl. No. 12/877,892, Date Filed—Sep. 8, 2010, First Named Inventor: Leland Kirchhoff, (18 pages).

"Communications—SMS", Dashboard Widgets—Showcase, Oct. 14, 2005, http://www.dashboardwidgets.com/showcase/details.php?wid=1082, (2 pages).

"Widget MySpace Widget", Posted by 4INFO Bob, Sep. 15, 2006, http://4info.typepad.com/blog/2006/09/widget_myspace_.html, (3 pages).

Johnson, Dave, "Now You're TALKING—voice-response system for home offices—Product Information", http://www.findarticles.com, Feb. 1999, (4 pages).

* cited by examiner

FACSIMILE TELECOMMUNICATIONS SYSTEM AND METHOD

The present application is a continuation of Ser. No. 12/355,470, filed Jan. 11, 2009, entitled "Facsimile Telecommunications System and Method", which is a continuation of U.S. patent application Ser. No. 10/795,025, filed Mar. 5, 2004 (now U.S. Pat. No. 7,480,065), the contents of which are incorporated herein in their entirety.

BACKGROUND OF THE INVENTION

1. Field of the Invention

This invention relates generally to telecommunications systems used in connection with facsimile (fax) transmissions. More particularly, it relates to additional capabilities and/or options for handling faxes.

2. Description of the Related Art

The electronic transmission of documents by way of fax systems continues to be commonplace and, often, an essential component of many business activities. With the emergence of electronic mail in the business environment, many predicted the demise of fax. This has not been the case.

However, there continue to be shortcomings among the fax systems currently in use in the business and consumer markets. In the business setting, fax machines may be busy or out of paper, preventing the receipt of incoming faxes. Furthermore, there generally is no real-time notification to a recipient that a fax has been sent to the recipient. That is, a fax recipient generally is not aware that a fax exists until it is hand delivered or picked up at the fax machine. If the recipient is expecting a fax, it is inconvenient for him to constantly check whether the fax has arrived if the fax machine is located far away from the recipient. Fax machines may also be shared by many users and, as a result, the sender of the fax often will feel obligated to take the additional step of drafting a cover page to identify the recipient of the fax. In some cases, faxed documents are of such a sensitive nature that the sender would like to have some control over who might see those documents as they move from the receiving fax machine to the actual recipient. In the consumer setting, individuals may not have access to a dedicated or shared fax machine and/or a dedicated fax line. This can make it difficult or impossible to receive faxes. These circumstances result in a number of practical problems for fax users.

In recent years, Fax-to-Email services such as that provided by CallWave, Inc. of Santa Barbara, Calif., have been introduced to address these problems for users with access to electronic mail systems. Typically, faxes are converted to email attachments and then sent to the recipient's email address. However, these services are only as reliable as the underlying email delivery system. Some email systems automatically reject messages with attachments, some email systems strip off attachments and some categorize fax-to-email messages as spam and discard the inbound message. In addition, if the email capacity of an individual's mailbox is full, the email system will reject the fax-to-email message. Furthermore, fax recipients typically do not receive a notification and/or fax until the entire fax has been delivered to the Fax-to-Email service and then sent through a private or public network (e.g., the Internet) to the recipient. Email delivery delays can occur when the Internet is used. Fax-to-Email services may provide the phone number from which the fax was sent in the header or body of the email message. However, in many cases, the recipient will not recognize this phone number because voice calls are not normally made from the same phone number. Furthermore, the phone number is provided with the fax attachment, rather than in advance, so that the recipient's ability to screen faxes is limited.

As a result, there is a need for fax systems that support real-time notification and/or reception of faxes by recipients, preferably by communications channels other than to fax machines or by email. There is also a need for fax systems with more sophisticated fax handling capabilities than are currently available.

SUMMARY OF THE INVENTION

In the present invention, a fax processing system overcomes some or all of the drawbacks discussed above. Faxes that are originally destined for a recipient's phone number are received by the fax processing system, which can provide more sophisticated fax handling capabilities. The fax processing system communicates with the fax recipient (aka, a subscriber) via a data communications network.

For example, in one implementation, the fax processing system interfaces to a PSTN on the one hand, and to the Internet on the other hand. Faxes sent to subscribers are received via the PSTN at the fax processing system. For example, fax calls may be forwarded from the subscriber's phone number to the fax processing system, or the subscriber's phone number may terminate in the fax processing system. Regardless, the fax processing system, in turn, transmits the fax and/or a fax notification to the subscriber via the Internet. Optionally, the subscriber can instruct the fax processing system to execute different fax handling instructions.

In one aspect of the invention, faxes are streamed to the subscriber, assuming s/he is online. Alternately, a fax notification rather than the entire fax can be streamed to the subscriber. Streaming allows notification or delivery of a fax in real-time or near real-time, which has advantages. For example, the resulting display may include information about the sender (e.g., as obtained from caller identification information) and allow the subscriber to take different actions with respect to the fax.

As a few examples of fax handling features, the subscriber may instruct the fax processing system to forward the fax, either to a different phone number(s) and/or to a different network address(es). Alternately, the subscriber can halt the fax receipt or the fax delivery, or block all future calls coming from the same phone number. Faxes can also be stored for future delivery, for example if the subscriber is not online when the fax is received. Different data rates can be used for delivery. In one approach, faxes are trickled down to the subscriber in the background so as not to fully consume the bandwidth of the subscriber's network connection. In another embodiment, the fax notification and/or fax could be broadcast to multiple locations.

Other aspects of the invention include other methods, devices and systems corresponding to the above.

BRIEF DESCRIPTION OF THE DRAWINGS

The drawings summarized below, along with the detailed description that follows, are provided to illustrate the other advantages and features of the invention and the appended claims.

DETAILED DESCRIPTION OF THE PREFERRED EMBODIMENTS

Figure 1:
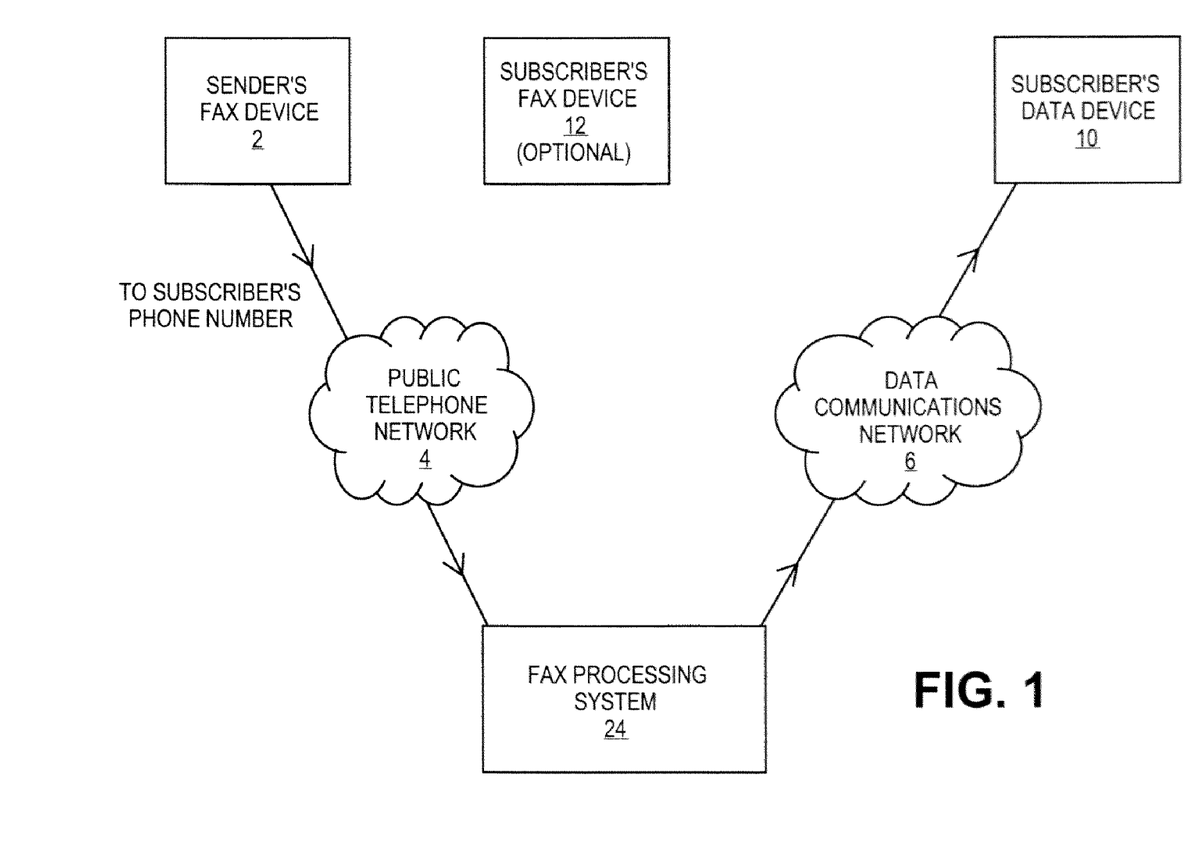
FIG. 1 is a block diagram of a telecommunications system with fax handling capabilities according to the invention.

FIG. 1 is a block diagram of a telecommunications system with fax handling capabilities according to the invention. Two networks are shown in FIG. 1: a public telephone network 4 and a data communications network 6. Examples of the public telephone network 4 include the PSTN, VoIP networks, and wireless networks. Examples of data communications network 6 include the Internet, virtual private data networks, and WANs. The data communications network 6 may carry information besides just data, for example it may carry both voice and data simultaneously.

A sender's fax device 2 is connected to the public telephone network 4 and a subscriber's data device 10 is connected to the data communications network 6. A fax processing system 24 is connected to both networks 4,6. The connections can be made either directly or indirectly. For example, the sender's fax device 2 could be a fax machine plugged into a telephone jack or routed through a PBX. It could also be a computer with fax transmission software that is connected to the public telephone network 4 via a LAN and a gateway (between the LAN and the telephone network). On the subscriber side, examples of the subscriber's data device 10 include computers, PDAs, and devices that combine both voice and data (e.g., a Handspring Treo). The data device 10 can be connected to the data communications network 6 by any means, including for example by a dial-up connection, a broadband connection (e.g., DSL, cable, or direct fiber), a direct connection to the core of the data communications network 6, or wireless access. The connections can be either permanent or temporary. In addition, although the fax processing system 24 is shown in FIG. 1 as a single box, it should be understood that parts of the fax processing system may be distributed among the different devices 2, 10 and networks 4, 6.

The sender would like to send a fax to the subscriber. The terms sender and subscriber are used loosely and may include people, companies, and computers, for example. In a direct fax-to-fax transmission, the sender's fax device 2 would dial the phone number for the subscriber's fax device 12, and the fax would be routed through the public telephone network 4 to the subscriber's fax device 12, which would then print out or otherwise display the fax.

In FIG. 1, the sender's fax device 2 initially proceeds the same as before. It functions as if to send the fax to the subscriber's phone number, but the fax call is received and handled by the fax processing system 24. For example, the fax call may be call forwarded from the subscriber's phone number to a phone number for the fax processing system 24, including call forward on busy (i.e., forward when the subscriber's phone number is busy), call forward all (i.e., forward all calls regardless of the state of the subscriber's phone number), and call forward no answer (i.e., forward if the subscriber's phone number rings but is not answered). Alternately, the subscriber's phone number may terminate at the fax processing system 24 so that the fax call is routed directly to the fax processing system. For example, the subscriber may be assigned a phone number that was originally obtained from the local phone carrier as terminating in the fax processing system 24. If the subscriber already has a phone number, it can be local number ported—i.e., ported from the local phone carrier to the fax processing system 24, so that calls terminate directly at the fax processing system.

Figure 2:
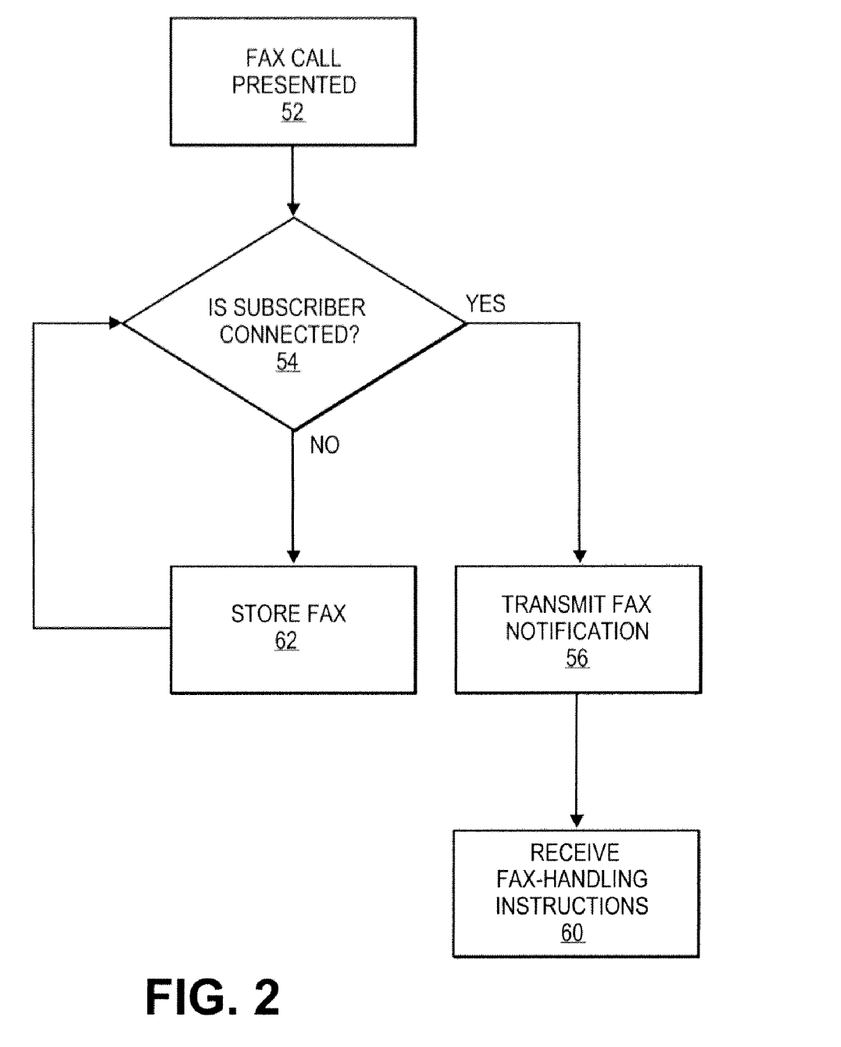
FIG. 2 is a composite flow diagram illustrating many different aspects of operation of the system in FIG. 1.

Use of the fax processing system 24 allows for more sophisticated fax handling options. FIG. 2 is a composite flow diagram that shows some of the different fax handling options that can be implemented. Different fax processing systems 24 can implement different features shown in FIG. 2. Upon receiving 52 the fax call, the fax processing system 24 can automatically handle the fax according to rules determined by the subscriber. For example, the fax processing system 24 may automatically block faxes from known telemarketers or from phone numbers on a subscriber's BLOCKED list. Alternatively, the fax processing system 24 may automatically send the fax, or a fax notification, to a network address (or addresses) specified by the subscriber.

As part of its fax handling, the fax processing system 24 may also determine 54 whether the subscriber is connected to the data communications network 6 and, if connected, the network address being used by the subscriber. If the subscriber is connected, the fax processing system 24 can immediately or in real-time notify 56 the subscriber of the incoming fax call at the subscriber's network address. Upon receipt of the notification, the subscriber may send 60 additional instructions to the fax processing system 24. In this way, the subscriber will not have to wait for the fax processing system 24 to receive the entire fax. After notifying the subscriber, the fax processing system 24 can begin streaming the incoming fax to the subscriber for display as it is being received. The subscriber may send additional instructions 60 to the fax processing system 24 in response to either receipt of the fax or the notification. In an alternate embodiment, the fax processing system 24 may automatically transmit the fax to the subscriber without first sending a fax notification.

If the subscriber is not connected to the data communications network 6, the fax processing system 24 can store 62 the fax. When the subscriber later connects 54 to the data communications network 6, fax handling can proceed as before.

The use of a fax processing system 24 has many advantages over direct fax-to-fax transmission or over current fax-to-email systems. The fax processing system 24 can be used to implement more sophisticated call handling features, for example using rules based on the sender's phone number or time of day. If the fax processing system 24 is accessible by the subscriber (e.g., over the Internet), then it may be simple for the subscriber to change the rules whenever he likes. The fax processing system 24 also allows the subscriber to more easily change or use different phone numbers and network addresses. For example, the subscriber may use different phone numbers for different purposes (e.g., one for business faxes, one for personal faxes, one for faxes from creditors). Different rules may apply to the different phone numbers, but faxes from all phone numbers may be sent to the same network address so that the subscriber can view all faxes from a single network address. Alternatively, the subscriber can use multiple network addresses so that he can vie faxes from a number of different locations or data devices.

The streaming aspect, if implemented, allows subscribers to handle faxes in a more real-time fashion. For example, two colleagues may be working on a document and one wants to share a drawing with the other. He can fax the drawing to his coworker's phone number, and the drawing is streamed to the coworker's desktop. Compare this to a fax-to-email system where the entire fax must first be received, then packaged as an attachment to an email, and then sent to the coworker. Assuming that the email with attachment is not stripped by firewalls or other protections, the coworker must then wait for delivery (which often can be delayed), and then must open the email and then the attachment. Other advantages will be apparent.

FIGS. 3-7 illustrate a specific implementation of the system shown in FIGS. 1-2. In this example, the public telephone network 4 includes the PSTN 104 and the data communications network 6 includes the Internet 106. The sender's fax device 2 is a simple fax machine 102. The subscriber's data device 10 is a computer 110, which the subscriber is using to access the Internet 106 via a dial-up connection. The subscriber has signed up for a Fax Line (FL) service, in which a phone number is assigned to the subscriber for the purpose of receiving faxes. This phone number terminates at the fax processing system 124 and does not normally terminate in the sender's physical fax machine, if he even has one.

Figure 4:
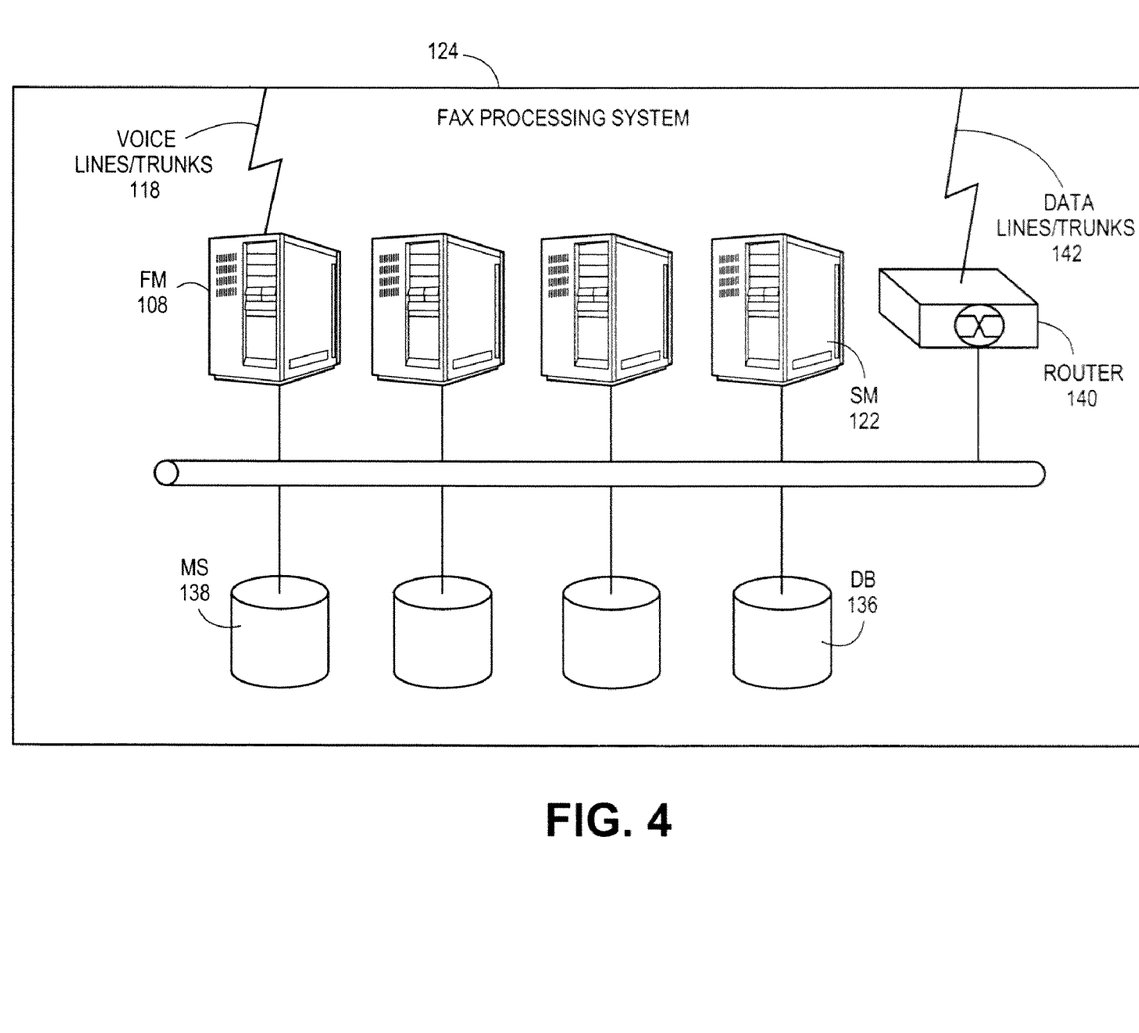
FIG. 4 is a block diagram showing further details of the fax processing system of FIG. 3.

FIG. 4 shows details of one implementation of the fax processing system 124. It includes a fax management (FM) subsystem 108, a router subsystem 140, an online presence-detection Internet session management (SM) subsystem 122, a shared media storage (MS) subsystem 138, and a database (DB) subsystem 136. Taking each subsystem in turn, the fax management subsystem 108 interfaces to the PSTN 104 and manages inbound fax calls and outbound fax or voice calls. Router subsystem 140 interfaces to the Internet 106 and manages communications between subscriber data devices and the various servers. The online presence-detection Internet session management subsystem 122 monitors the status of subscriber data devices to determine availability for fax notification and delivery services. The shared media storage subsystem 138 persistently archives fax messages. The database subsystem 136 contains records for the subscribers, including rules to be applied for fax handling. It may also store the subscriber's address book and/or preferences. These various subsystems may be interconnected via Local Area Networks (LAN), private virtual networks running over the Internet and/or Wide Area Networks (WAN).

Referring back to FIG. 3, the sender's fax machine 102 is connected to a local exchange carrier (LEC) switch via telephone lines 134. The fax machine 102 can be directly connected to the LEC over conventional POTS (Plain Old Telephone Service) lines or via local extension lines behind a corporate Private Branch Exchange (PBX). Alternatively, the fax machine 102 could be a computer with a fax modem connected to a LEC switch via telephone lines 134.

Figure 3:
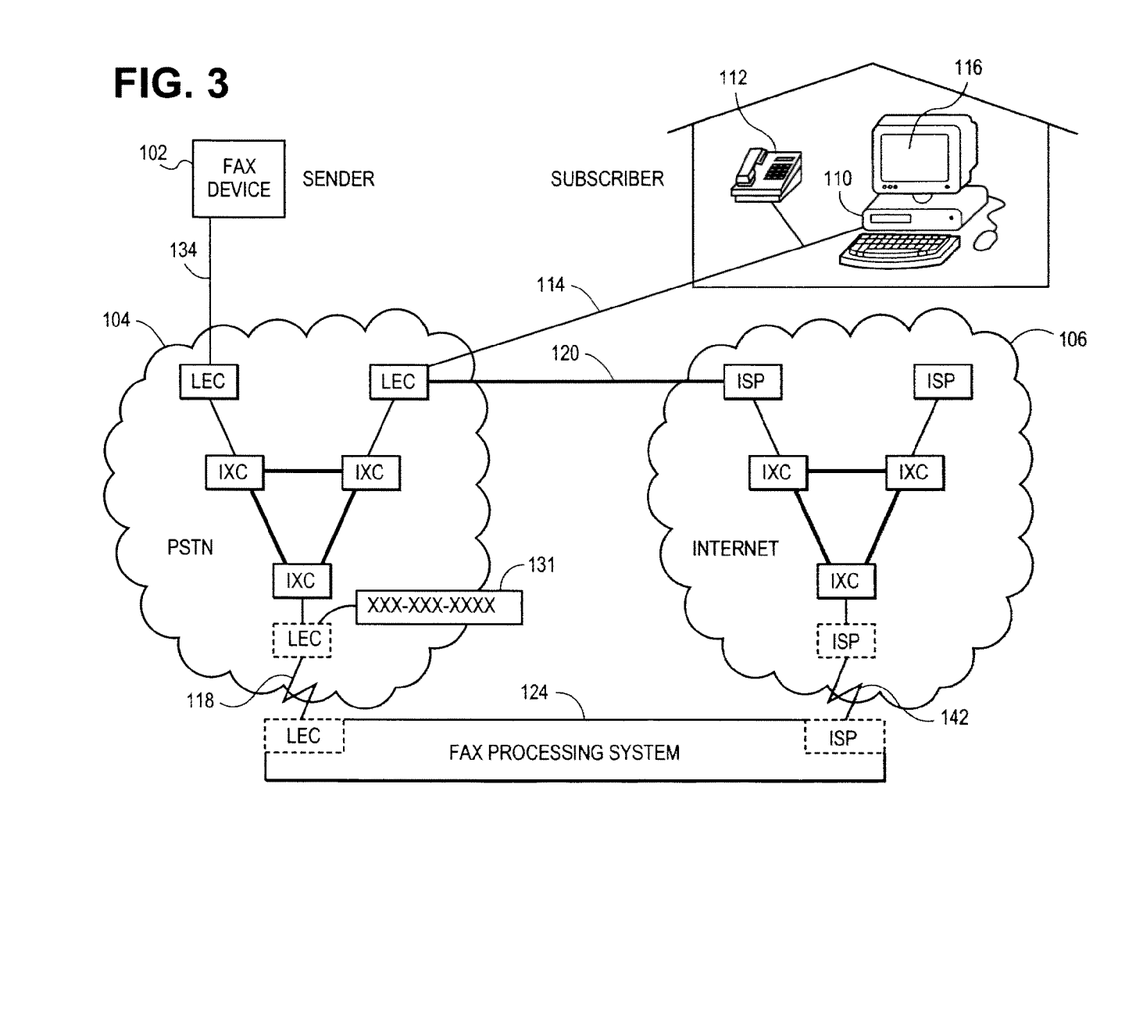
FIG. 3 is a block diagram of one implementation of the system of FIG. 1.

A ten-digit North American telephone number (shown as 131) is assigned to the subscriber during the FL registration process. Calls to the FL phone number 131 route through the PSTN via InterExchange Carrier (IXC) switches and/or Local Exchange Carrier (LEC) switches to eventually terminate at the fax processing system 124. The fax machine 102 and the assigned FL phone number 131 can be connected to the same switch or different switches. If the fax machine 102 and FL number 131 are coupled to the same switch, the switch will be local to both the calling and called parties, as with intra-LATA or local calls. If the fax machine 102 and FL number 131 are coupled to different switches, each switch may be local only to one of the parties, as is the case for non-local calls such as inter-LATA (long-distance) calls.

In the example of FIG. 4, the FM subsystem 108 is connected to the PSTN 104 through voice trunk circuits 118 that directly interface with the Inter Exchange Carrier's (IXC) circuit-switched or packet-switched telephony network. Thus, advantageously, the fax processing system 124 does not have to be directly serviced by the same Local Exchange Carrier (LEC) switch or PBX as the fax machine 102. Because of this, the fax processing system 124 or its individual subsystem components can be located in a different geographical area (for example, a different country) than the sender and subscriber. In this embodiment, the fax processing system 124 is locally attached to a LEC switch with a physical line or local trunk interface circuit. In such cases, the switch may or may not be serving fax machine 102. In yet another embodiment, the FM subsystem 108 may be connected to the PSTN 104 via a VoIP (Voice over Internet Protocol) network and associated routers 142.

The FL trunk circuits 118 are not limited to a particular signaling convention. For example, the present invention can be utilized with a Common Channel Signaling (CCS) system, such as Signaling System 7 (SS7), that has separate voice/user data and signaling channels. In addition, the present invention can be used with other signaling methods, such as the following trunk-side signaling interfaces: ISDN-PRI, Advanced Intelligent Network (AIN), and/or Service Node architectures. Preferably, the selected signaling system provides a suite of call-presentation information to the fax processing system 124, including one or more of the following:

| | |
|---|---|
| ANI | Automatic Number Identification ("Caller ID"): phone number and privacy indicator of the calling party (the sender in this example). |
| DNIS | Dialed Number Identification System: phone number of the called party (the FL phone number in this example). |

The telephone line 114 may be shared with one or more computer terminals. For example, telephone 112 shares the telephone line 114 with a computer terminal 110. In this example, the telephone line 114 is used to establish a dial-up connection for a computer terminal 110, via the computer modem, to an Internet Service Provider (ISP) offering dial-in remote-access service connections from the PSTN 104 via trunk interface circuits 120. The computer terminal 110 can also be connected to the Internet 106 via a broadband connection (such as a DSL or cable modem service, or a T1 line). While the subscriber's data device is shown as a computer terminal 110 in FIG. 3, it can also be an interactive television, a network-enabled personal digital assistant (PDA), another IP (Internet Protocol) device, or the like. If the computer terminal 110 is a personal computer, it can be equipped with a monitor, keyboard, mouse, disk drive, sound card (or similar sound-reproduction circuitry, such as a codec), streaming media playback software (such as the Media Player program available from Microsoft), speakers, and a modem (such as a standard V.90 56K dial-up modem).

In this implementation, a client application 116 for the fax processing system 124 resides and executes on the computer terminal 110. The client application 116 is connected to, and communicates with, the fax processing system 124 via the Internet 106.

The fax processing system 124 optionally hosts a web site used by subscribers of the FL service to set up and manage their accounts. Set-up and management functions can be implemented by the client application 116 as well.

The SM subsystem 122 monitors the Internet for online IP devices registered to subscribers to determine their availability for receiving faxes. When a subscriber connects to the Internet using a dial-up ISP, for example, the client application 116 makes the subscriber's online presence known to the fax processing system 124. Presence detection can be performed by the SM subsystem 122 polling or pinging the client application 116, or by the client application 116 transmitting a "Login/I'm alive" message and/or subsequent periodic "Keep alive" messages to the SM subsystem 122. This is just one example of presence management. Broader presence management techniques could be employed including IETF SIMPLE technology.

If, rather than using a dial-up connection, the subscriber is using a broadband, always-on connection, such as a DSL or cable modem service, the client application 116 typically becomes active when the computer terminal 110 is turned on or powered up, and it stays on until the subscriber manually shuts down the client application 116 or the computer 110 is turned off or powered down.

Figure 5:
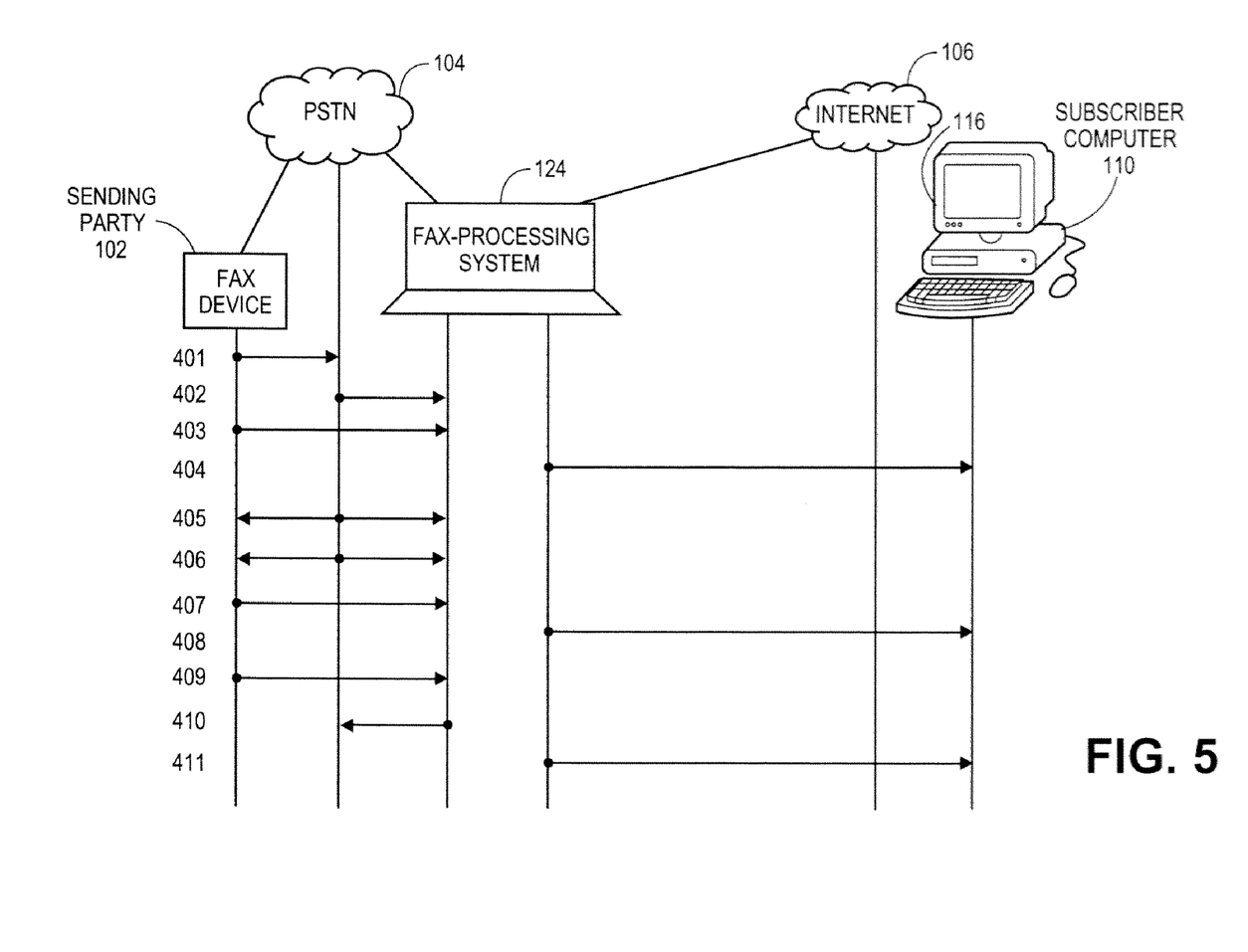
FIG. 5 is a call-flow diagram illustrating an example function implemented by the system of FIGS. 3 and 4.

FIG. 5 is a call-flow diagram that illustrates one example of fax handling. For clarity, the full details shown in FIGS. 3 and 4 are not repeated in FIG. 5. In this example, the sending party is associated with fax machine 102 and the subscriber's phone number is the one assigned to the subscriber as part of the FL service. The FL service is set up to transmit a fax call notification and stream the inbound fax to the subscriber.

The sending party initiates a fax call using his fax machine 102 by dialing 401 the subscriber's FL number 131. The PSTN 104 routes 402 this call to the FM subsystem 108 in the fax processing system 124. The fax processing system 124 receives 403 the incoming call and based at least in part on the phone number called (obtainable by DNIS for example), the FM subsystem 108 queries the SM subsystem 122 and the DB subsystem 136 to determine whether the called number is registered to a subscriber, what the subscriber's fax handling preferences are, and whether the subscriber is online.

If the FL subscriber's computer terminal 110 is online, the FM subsystem 108 opens a communication channel over the Internet 106 to the client application 116 running on the subscriber's computer terminal 110. The fax processing system 124 transmits 404 a fax call notification to the subscriber's computer terminal 110.

If available, and if not designated as private, the Caller ID of the sending party is transmitted 404 to the client application 116 and displayed along with an optional sound notification. The Caller ID may come from different sources. For example, the sending fax device may provide caller identification information, or it may be provided during setup of the call by the telephone network. The information may also be automatically entered into the subscriber's address book. The sound notification can be in the form of ringing, which is produced through the called party's computer terminal 110 speakers. In addition, the FM subsystem 108 performs a Caller Name database lookup using the Caller ID of the calling party. The Caller Name, if available, is transmitted 404 to the client application 116 and displayed to the subscriber.

Around the same may be before or after), the fax processing system 124 answers 405 the incoming call and establishes 405 a full duplex, (two-way) talk path with the sending party. The fax processing system 124 negotiates 406 a fax transmission session with the fax machine 102 and begins to receive the fax. The FM subsystem 108 records and stores the caller's fax message in the MS subsystem 138 while simultaneously streaming 408 the fax through the opened Internet channel to the client application 116 on the subscriber's computer terminal 110. The client application 116 launches the computer terminal's 110 image-viewing software (for example, Adobe Acrobat) to display the streamed fax pages on the computer terminal's 110 monitor. The fax transmission 408 to the subscriber can begin regardless of whether the entire fax has been received 407 by the fax processing system 124.

When the sending fax machine 102 completes the fax transmission, it terminates 409 the call. The fax processing system 124 then releases trunk resources and signals 410 Call termination to the PSTN 104. The fax processing system 124 also signals 411 completion of the fax transmission to the subscriber by sending a corresponding control message which is displayed to the subscriber via the client application 116 as an entry in the call log (for example, 5 page fax 610).

Steps 401-411 illustrate one approach for streaming of a fax to a subscriber. Many variations will be apparent. For example, if the subscriber's connection to the Internet 106 is a narrow-band dial-up connection over a telephone line 114, a hybrid real-time solution can be used. Instead of transmitting the fax to the subscriber's computer terminal 110 at the maximum data rate possible, the FM subsystem 108 working in conjunction with the client application 116 begins to "trickle" download the fax from the MS subsystem 138 to the subscriber's computer terminal 110 over the open Internet communication channel 106. In one approach, the fax is divided into smaller files that are downloaded and reassembled by the client application 116 on the subscriber's computer terminal 110. In another, the fax is simply transmitted at a lower data rate than the maximum available, for example in order to reduce congestion across the subscriber's Internet connection. Whatever the implementation, trickle download helps ensure that bandwidth is available to the subscriber for other purposes. The trickle download can transition to a faster download, for example if the subscriber requests to view the fax immediately. The trickle download may also be interrupted if the Internet connection 114, 120, 142 is terminated. On the next Internet connection, the client application 116 can resume the trickle download where it left off. In some cases, downloads will be visible to the subscriber as an active call state, as shown for example in a pop-up window. Alternately, the subscriber can determine the data rate used to download the fax.

In another variation, a client/server protocol can be designed to operate through private and public firewalls. In this approach, the client application 116 opens a channel through the firewall by initiating "trusted" communication from inside the firewall to the fax processing system 124 outside the firewall. The client application 116 sends a "keep alive" packet through the firewall, over the Internet channel 106 to the SM subsystem 122. This "keep alive" message creates an open channel through the firewall along with a back channel from the SM subsystem 122 to the client application 116 to allow a reply with an acknowledgement message. When a new fax call is presented at the FM subsystem 108, the FM sends a call presented message to the SM subsystem 122, which relays the message to the client application 116 over this back channel. The call presented message includes the network address of the FM and can be used by the client application 116 to initiate streaming of the fax message by directly sending a new message to the FM subsystem 108 thereby opening an additional pair of communication paths. The FM subsystem 108 then acknowledges receipt of this message from the client and begins delivering the stream of fax content on the additional back channel.

Figure 6:
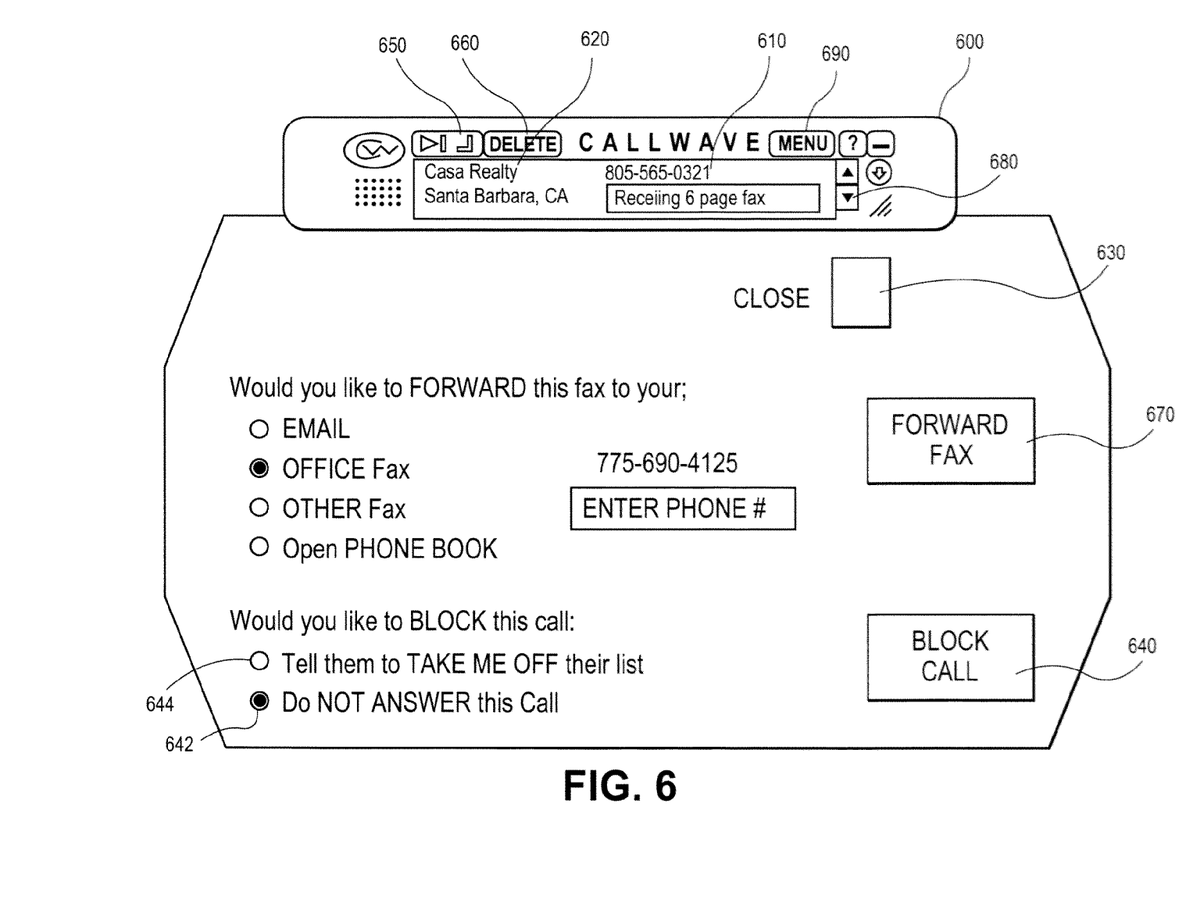
FIG. 6 is a graphical depiction of a display of a fax notification with options for additional fax handling.

In addition to receiving faxes or fax notifications, the subscriber may also be presented with different fax handling options. FIG. 6 shows a pop-up dialog menu that contains a fax notification 600 (including the Caller ID 610 and Caller Name 620 in this case) and which also contains options for additional fax handling.

If the subscriber ignores the notification pop-up menu, the fax processing system 124 will handle the fax according to the subscriber's default rules. For example, the subscriber may have selected for the fax to be automatically streamed to his computer terminal. Alternately, the subscriber may have selected for the fax to be stored until the subscriber affirmatively elects to retrieve the fax.

Alternately, the subscriber may choose to ignore the incoming fax. For example, the fax may not have been urgent enough to interrupt what the subscriber was doing, or the fax may have been intended for another member of the household. The subscriber can close the fax handling options dialog box shown in FIG. 6 using the "CLOSE" option 630, which will instruct the fax processing system 124 that no further fax handling instructions will be arriving from the subscriber. The fax processing system 124 will then take appropriate actions. In one approach, the fax processing system 124 will wait until the entire fax has been received and then will transmit the fax in the background to the subscriber's computer terminal 110. The client application's 116 call log, which lists the faxes handled by the fax processing system 124 for the subscriber, is updated. At this point, the fax is available locally on the computer terminal 110 for viewing at the subscriber's convenience. It is also archived in the MS subsystem 138, so that it can be viewed from other computer terminals.

Figure 7:
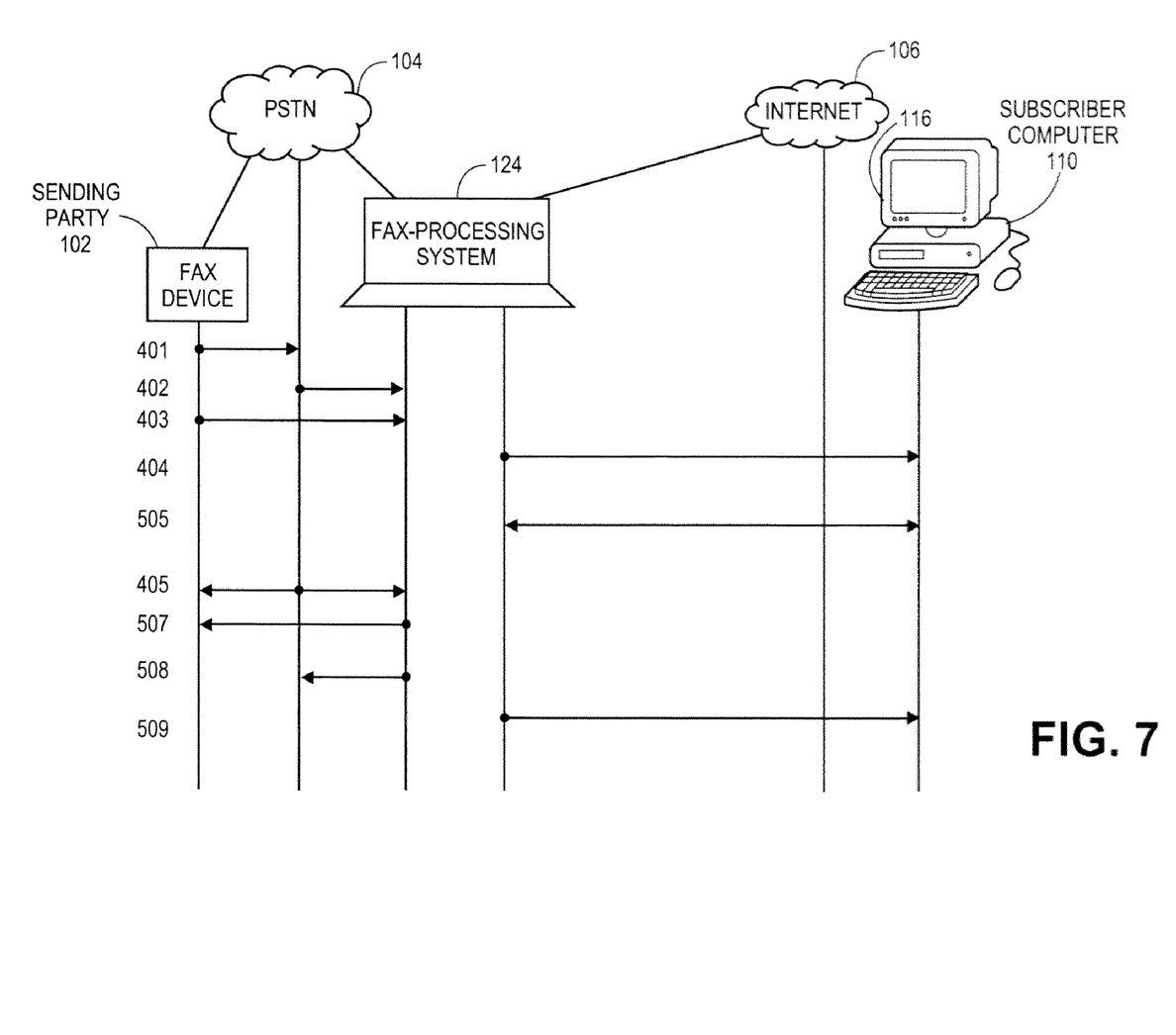
FIG. 7 is a call-flow diagram illustrating another example function implemented by the system of FIGS. 3 and 4.

As another option, the subscriber may choose not to accept calls from the sending party. Referring to FIG. 7, steps 401-405 take place as in FIG. 5. Having screened the fax call, the subscriber can signal 505 the fax processing system 124 to abort the fax reception and to communicate the request not to be called in the future. For example, the subscriber can activate the "BLOCK CALL" option 640. In this example, the subscriber can either select a "Do NOT ANSWER this Call" option 642 or a "Tell them to TAKE ME OFF their list" option 644. The client application 116 sends 505 a corresponding instruction to the fax processing system 124. Upon receiving the "Do NOT ANSWER this Call" instruction, the fax processing system 124 interrupts recording of the fax and/or deletes the recorded fax. Upon receiving the "Tell them to TAKE ME OFF their list" instruction, the fax processing system 124 also plays 507 a voice prompt to the sender, such as "The person you have called does not accept solicitations. Please remove this phone number from your calling list. Thank you and goodbye." The fax processing system 124 disconnects 508 the call and makes 509 a corresponding entry in the subscriber's call log (e.g., telemarketer). In yet another option, the fax processing system 124 can send a "canned reply" fax to the sender. This reply formally requests that the sender remove the subscriber from their fax broadcast list.

The options dialog box could pop an additional query to determine if the subscriber would like the fax processing system 124 to always apply this treatment to future calls from this sender phone number. This automatic fax handling rule can be stored in a table of subscriber preference settings for the fax processing system 124, for example in DB subsystem 136 as a simple extension table of the subscriber's address book. If directed to do so, the fax processing system 124 would automatically block future calls from this sender and relieve the subscriber from having to handle them.

As another variation, the subscriber can monitor the Caller ID and Caller Name of the incoming call and decide not to accept calls from this sender. The fax processing system 124 could be optionally configured to delay answering the incoming fax for a fixed time interval or for a specific number of ring cycles in order to allow the subscriber time to review the Caller ID and Caller Name. If the client application 116 instructs the fax processing system 124 to block the call before the incoming call has been answered, the fax processing system 124 will ignore the call (that is, let it ring) or reject it with an appropriate error tone and/or audible error message; e.g. a network reorder tone or special information tone along with a system error announcement (these methods can defeat fax spam systems). If the client application 116 instruction comes after the incoming call has been answered, the fax processing system 124 will handle the fax as described above.

Finally, the client application 116 provides the subscriber with additional utility including but not limited to: the ability from the menu option 690 to forward the fax as an attachment to an email address or fax to another fax number, delete the fax from the call log 660, launch a viewer 650 to display the fax on the computer or on a printer, scroll through a list of voice and fax calls 680, and undelete a previously deleted fax from the menu option 690.

As another variation of fax handling, the following process describes a scenario when the subscriber's computer terminal 110 is offline. When the fax call arrives on one of the FL trunks 118, along with the signaling information, the FM subsystem 108 queries the SM subsystem 122 and/or the DB subsystem 136 using the incoming call's DNIS (called number) to determine whether the call is for a registered subscriber, what the subscriber's online/offline presence status is, and to retrieve that subscriber's fax handling preference rules. If the fax processing system 124 determines that the subscriber is not connected (i.e., he is offline or otherwise unavailable), the fax processing system will carry out default rules for handling the call. These default rules may be the same for all subscribers or they may be individually determined by subscribers.

An example default rule is to answer the call and record the fax, for later notification and/or transmission when the subscriber comes online. Other fax handling rules could include the fax handling options described previously. For example, the CM subsystem 108 may optionally block the incoming fax based on the Caller ID. Regardless, when the subscriber subsequently connects to the Internet over a broadband or dial-up connection 114, 120, the client application 116 checks in with the SM subsystem 122. Client synchronization allows faxes not previously received by the client application 116 to be presented. In this implementation, new faxes delivered by synchronization are treated in the same fashion as new calls that were received directly by the client application 116 when the subscriber's computer terminal 110 was online. Furthermore, the process of trickle or burst downloading of faxes can begin as described above. As an additional option, a message-waiting indication can be activated or a Short Message Service (SMS) message or paging alert sent if any new faxes are placed into the call log. Message-waiting indication is active until the faxes have been viewed or the message-waiting light/con has been deactivated by the subscriber.

FIGS. 5-7 illustrate some specific examples of features implemented by a fax processing system 124. Other features will be apparent. For example, rather than transmitting the fax or fax notification to a single network address for the subscriber, the fax processing system 124 could broadcast the fax to multiple network addresses or even to network addresses for multiple subscribers. Alternately, the faxes could be transmitted to one or more fax devices. Routing of the faxes can be determined by rules determined in advance, or by instructions received from the subscriber (for example via a pop-up dialog menu).

The detailed description contains many specifics. These should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents. Furthermore, no element, component or method step is intended to be dedicated to the public regardless of whether the element, component or method step is explicitly recited in the claims.

What is claimed is:

1. A method for handling fax transmissions, comprising:
   receiving a fax call to receive a fax via a public telephone network at a fax processing system, the fax call originally destined for a subscriber's phone number;
   in response to receiving the fax call, determining that the subscriber is connected to a data communications network at a network address on the data communications network; and
   in response to determining that the subscriber is connected to the network, streaming the fax to the subscriber's network address by the fax processing system, wherein the streaming of the fax begins while the fax call is in process and regardless of whether the fax has been completely received.

2. The method of claim 1, further comprising:
   halting streaming of the fax upon interruption of the subscriber's connection to the data communications network; and
   automatically resuming transmission of the fax upon reconnection by the subscriber.

3. The method of claim 1, wherein streaming the fax comprises:
   streaming the fax to the subscriber's network address in real-time.

4. The method of claim 1, wherein streaming the fax comprises:
   streaming the fax through a firewall to the subscriber's network address.

5. The method of claim 1, wherein streaming the fax comprises:
   streaming the fax to the subscriber's network address at a data rate that reduces congestion with other transmissions to or from the network address.

6. The method of claim 1, wherein streaming the fax comprises:
   streaming the fax to two or more network addresses.

7. The method of claim 1, further comprising:
   transmitting options for fax handling instructions.

8. The method of claim 7, further comprising:
   receiving a fax handling instruction from the subscriber at the fax processing system.

9. The method of claim 8, wherein streaming the fax comprises:
   streaming the fax to the subscriber's network address at a data rate indicated by the fax handling instruction.

10. The method of claim 8, wherein streaming the fax comprises:
    beginning streaming of the fax to the subscriber's network address at a first data rate; and
    after streaming of the fax to the subscriber's network address has begun, changing streaming of the fax to a second data rate according to the fax handling instruction.

11. The method of claim 8, further comprising:
    deleting the fax according to the fax handling instruction.

12. The method of claim 1, further comprising:
    transmitting an indication that the fax call is in process.

13. A fax processing system, comprising:
    a fax management subsystem coupled to a public telephone network to receive a fax call for receiving a fax, the fax call originally destined for a subscriber's phone number; and
    an online presence detection subsystem coupled to a data communications network to monitor status of a subscriber data device to determine availability of the subscriber data device for receiving data at a network address on the data communications network,
    wherein the fax management subsystem is to stream the fax to the subscriber's network address in response to a determination that the subscriber's data device is available, and wherein the streaming of the fax begins while the fax call is in process and regardless of whether the fax has been completely received.

14. The fax processing system of claim 13, wherein the fax management subsystem halts streaming of the fax upon interruption of the subscriber's connection to the data communications network and automatically resumes transmission of the fax upon reconnection by the subscriber.

15. The fax processing system of claim 13, wherein the fax management subsystem streams the fax to the subscriber's network address in real-time.

16. The fax processing system of claim 13, wherein the fax management subsystem streams the fax through a firewall to the subscriber's network address.

17. The fax processing system of claim 13, wherein the fax management subsystem streams the fax to the subscriber's network address at a data rate that reduces congestion with other transmissions to or from the network address.

18. The fax processing system of claim 13, wherein the fax management subsystem streams the fax to two or more network addresses.

19. The fax processing system of claim 13, wherein the fax management subsystem transmits options for fax handling instructions to the subscriber's data device while the fax call is in process.

20. The fax processing system of claim 19, wherein the fax management subsystem receives a fax handling instruction from the subscriber's data device while the fax call is in process.

21. The fax processing system of claim 20, wherein the fax management subsystem streams the fax to the subscriber's network address at a data rate indicated by the fax handling instruction.

22. The fax processing system of claim 20, wherein the fax management subsystem begins streaming of the fax to the subscriber's data device at a first data rate and, after streaming of the fax to the subscriber's data device has begun, changes streaming of the fax to a second data rate according to the fax handling instruction.

23. The fax processing system of claim 20, wherein the fax management subsystem stops streaming of the fax and deletes the fax from a call log according to the fax handling instruction.

24. The fax processing system of claim 13, wherein the fax management subsystem transmits an indication that the fax call is in process to the subscriber's data device while the fax call is in process.

* * * * *